US 6,736,478 B2

(12) United States Patent
Franzke et al.

(10) Patent No.: US 6,736,478 B2
(45) Date of Patent: May 18, 2004

(54) AUTOMATIC IMAGE QUALITY DETERMINATION (75) Inventors: Dieter Franzke, Windisch (CH);
Adrian Kohlbrenner, Thalwil (CH);
Armin Kündig, Zürich (CH)

(73) Assignee: Gretag Imaging Trading AG, Wettingen (CH)

( * ) Notice: Subject to any disclaimer, the term of this patent is extended or adjusted under 35 U.S.C. 154(b) by 0 days.

(21) Appl. No.: 10/205,306

(22) Filed: Jul. 24, 2002

(65) Prior Publication Data
US 2003/0020776 A1 Jan. 30, 2003

(30) Foreign Application Priority Data
Jul. 24, 2001 (EP) .............................. 01117647

(51) Int. Cl.⁷ .......................... B41J 29/393; B41J 2/165
(52) U.S. Cl. .......................................... 347/19; 247/24
(58) Field of Search ............................... 347/19, 14, 23, 347/10–12, 16, 101, 5, 8, 9, 24, 43, 115, 15, 49; 358/527, 501; 399/39; 400/76

(56) References Cited
U.S. PATENT DOCUMENTS

| 4,949,135 A | 8/1990 | Ng | 399/39 |
|---|---|---|---|
| 5,031,534 A | 7/1991 | Brunner | 101/365 |
| 5,293,539 A | 3/1994 | Spence | 358/527 |
| 5,508,826 A | * 4/1996 | Lloyd et al. | 358/501 |
| 6,147,698 A | 11/2000 | Zable et al. | 347/240 |
| 6,297,873 B1 | * 10/2001 | Furuya | 355/40 |

FOREIGN PATENT DOCUMENTS

| EP | 0 864 422 | 9/1998 |
|---|---|---|
| EP | 1 030 513 | 8/2000 |
| WO | 0 582 997 | 2/1994 |
| WO | WO 99/26407 | 5/1999 |

* cited by examiner

Primary Examiner—Raquel Yvette Gordon
Assistant Examiner—Charles Stewart, Jr.
(74) Attorney, Agent, or Firm—Peter F. Corless; Steven M. Jensen; Edwards & Angell, LLP (57) ABSTRACT The invention relates to a process for automatically determining the image quality of inkjet photo printers or color inkjet photo printers, whereby a digital reference test chart is produced which is made available to the printer. The printer or photo printer prints out the reference test chart so that a photo printer specific printout of the reference test chart is generated, which is digitized for comparison of the digitized image data with an optimum digital reference test chart, for determination of the image quality of the printed image on the basis of deviations or concurrences between the photo printer specific test chart printout and the reference test chart.

10 Claims, 7 Drawing Sheets (6 of 7 Drawing Sheet(s) Filed in Color)

AUTOMATIC IMAGE QUALITY DETERMINATION

FIELD OF THE INVENTION

The present invention relates to a process for the automatic determination of an image quality of a copy or picture obtained by a printing or print device or exposure device, especially for inkjet photo prints. Furthermore, the invention relates to a data carrier with a corresponding process in any desired programming language for the control of electrical or electronic functional devices for the realization of the process.

BACKGROUND ART

It is known in the prior art to use processes for the improvement of pictures. For example, the image quality can be improved by changing the color spectrum during the exposure or by brightening or darkening portions of a picture. It is also possible to carry out other quality improvements which some customers find pleasing.

While it is possible to improve the image quality of a picture, there is practically no possibility to generally define the concept of image quality and to make determinations in relation to such a generally valid definition of the image quality, such as that a color inkjet printer needs maintenance, another control software must be used, or the like.

Although the possibility exists for laser copiers or inkjet printers to carry out a correction and optimization printer internally by way of also printed patterns, this conventional testing and correction technology, however, does not lead to a more generally valid definition.

It is therefore in the prior art still a matter of experience and decision for an observer whether an image quality is sufficient, deserves improvement, or falls outside a tolerance interval. Thus, a picture can still be to one observers taste, while another already detects disturbing effects, such as, unpleasant graininess, unpleasant coalescence or a visible horizontal or vertical banding. Of course, color defects can be created, the contrast can be insufficient, and the like.

These totally different picture defects and further picture defects not mentioned here can occur in actual pictures and be noticed by some customers, while others do not recognize those defects. Correspondingly, an operator of a picture printer or photo exposer can be more discriminating or less, since the concept of the image quality itself is neither standardized nor set. The quality of image data in and of itself can also lead to deviations in the copies to be produced and can also lead to unfounded quality complaints. For example, digital image data can be deficient (for example, local resolution too low because of an insufficient number of pixels, or color depth insufficient) and the deficient image quality attributed to the photo printer, which principally has nothing to do with the deficient image quality, since it would definitely be in a position to produce better pictures, if it had correspondingly good data available. The software for the processing of image data can also create problems here so that it would be advantageous from this point of view to be able to better localize errors, for example, when a photo printer operates satisfactory, while the image data are or the image data processing is deficient.

SUMMARY OF THE INVENTION

It is thus an object of the present invention to provide a process for automatic image quality determination to enable especially an objective, observer independent determination of an image quality.

It is a further object to provide a process which enables the detection of the necessity for maintenance or calibration of a photo printer and especially a color inkjet photo printer, or to better localize deficiencies within the individual stations of the picture production. Especially, deficiencies of the materials used, for example, paper, ink, toner, developing chemicals can be determined.

According to one aspect of the invention, the advantages achieved are based on the generation of a digital reference test chart or a set of digital reference test charts. Such reference test charts can be produced both directly digitally as well as by digitalization of corresponding originals. A photo printer, especially an inkjet photo printer or color inkjet photo printer, which is to be tested with respect to its image quality is provided with the digital form of the reference test chart for printout. A photo printer specific test chart print is hereby produced on the basis of the digital form of the reference test chart. The photo printer specific test chart print is scanned after printing. This scanned and therefore digital form of the photo printer specific test chart print is then compared with a digital form of the reference test chart. A quality parameter or a standardized quality value achieved by a photo printer and especially a color inkjet photo printer can then be calculated from the conformities and/or deviations based on the comparison between the reference test chart and the photo printer specific test chart print.

The reference test chart preferably includes several test patterns which specifically react to differentiable causes for deficient image quality, or such test patterns can be positioned on a set of reference test charts. The test patterns of the reference test chart can then be compared with the corresponding test patterns of the photo printer specific test chart print or the digitized image data thereof. The test patterns of the reference test chart are thereby preferably assigned optimum quality values. These are compared with actual quality values of a photo printer specific test pattern and the quality of the printouts or the image prints of a photo printer can be determined on the basis of deviations therebetween. Tolerance intervals can thereby be assigned to the photo printer specific test pattern or the reference test pattern, within which the corresponding quality deficiency is still acceptable. Beyond these threshold values or this tolerance interval, corresponding reactions can be initiated, such as the automatic scheduling of maintenance, the specific use of error correction software, the discontinued use of deficient materials consumed, or the like.

According to the present invention, it is especially possible to test the products of inkjet printers for the manufacture of customer specific copies by way of apparatus specific test prints. Preselected test patterns are thereby used, as mentioned above, and these printed test patterns are scanned or digitized for subsequent comparison with the digital reference test patterns. Image characteristics are thereby especially considered which can influence the image quality, especially such effects as banding, coalescence, color bleed, dot gain, image and color misregistration and image parameters such as graininess, uniformity, image sharpness (which means the contrast resolution behaviour) and color balance. These effects can be determined for each individual print color, but also for mixed colors.

The scanned apparatus specific test charts prints are evaluated using any desired image analysis method, especially already known image analysis methods, and specific parameters are determined which by comparison with the digital form of the reference test chart open up the possibility of determining an image quality value.

It is possible that the image quality so determined only insufficiently corresponds to the image quality perceived by a human, especially since the unweighted technical image quality determined so far is based on purely physical, which means especially directly measurable, parameters. It is specifically possible to also carry out weighting or acceptance tests with one or more test persons, in order to determine relevant tolerance intervals or their end values, which means in order to transform the unweighted, technical image quality into a perception aligned image quality.

A standardization is preferably also incorporated into the process according to the invention, in order to consider apparatus specific properties of apparatus which play a role in the process in accordance with the invention for image quality determination. For example, if a flatbed scanner with certain characteristics is used for the scanning of a photo printer specific test chart print, it can be taken into consideration with respect to this scanner that it may not capture the graininess of a test chart print as well as another flatbed scanner. Correction values can here be introduced, for example, during the digital analysis of the scanning results, which during the evaluation of the graininess of a corrected captured test print cause the graininess to be evaluated worse than indicated by the use of the correction values, since it is known that the uncorrected evaluation based on the specific type of flatbed scanner underestimates the degree of graininess. This type of calibration can be carried out device specific and also dependent of the device settings.

For example, it is possible to compensate for the properties of a digital camera which is used for the scanning of a printer specific test chart print, in that a device profile is taken into consideration which must be characteristic of the respective digital camera or its properties. The image data captured by the camera can be offset against the device profile so that calibrated image data result which provide exclusive information on the actual image quality of the respective color inkjet printer and no longer include falsifications which were added by other apparatus involved in the image quality determination process. Such an apparatus specific device profile of scanners or digital cameras can be produced in the form of a generally known ICC profile with common software and can automatically accompany the scanned image data in order to be automatically considered during the calculation of the image quality.

During the determination of the image quality, a transformation of the image data into a suitable color space is also normally used. Although any color space can be used, it has been proven advantageous when the color space into which the data for the comparison with the reference test pattern are transformed takes human perception into consideration. It is advantageous in this connection when the target color space meets the physiological color perception of a human, which can be achieved, for example, by a transformation of the image data into the CIE Lab color space.

Although it is possible to manually align or orient the photo printer specific test chart prints with respect to a scanner or a digital camera, it is advantageous for the prevention of errors or misorientations and for the simplification of the work process to provide the reference test chart and thereby also the photo printer specific test chart print with orientation patterns or markings which enable a scanner or a digital camera to determine the absolute location and/or size of the photo printer specific test chart print, so that it is ensured that the test patterns of the photo printer specific test chart prints are found and placed into the desired relation to the corresponding patterns of the reference test chart. Of course this operation can also be subsequently carried out by a computer which examines the image of the test chart print delivered by the scanner or the digital camera with respect to the orientation patterns and carries out the assignment of the individual test patterns by way of these orientation patterns and carries out all further calculation steps which are dependent on the location of the test patterns. In this manner, other possible error sources, such as orientation errors and distortions can also be compensated.

Of course, it is possible to provide further information on a reference test chart with a photo specific test image, such as a code for a specific photo printer or the like, for example for statistical purposes. Information can of course also be provided on the reference test chart to enable an analysis program used to give information on the desired analysis parts, on parameters and more of the like.

Several known analysis processes will be disclosed in the following by reference to their literature citations. The respective literature citations are expressly incorporated into the present disclosure and the individual analysis processes or combinations thereof form part of the present disclosure. This means claims may be directed to the processes according to the following literature citations. The publications incorporated by reference herein are as follows:

For the image quality metrix: D. Rene Rasmussen et al, "Image Quality Metrix: Applications and Requirements", IS&T's 1998 PICS Conference; for coalescence: Nathan Jones et al., "Characterizing and modeling coalescence in inkjet printing", IS&T, NIP14, International Conference on Digital Printing Technologies, October 1998, Toronto; for banding: Guo-Yau Lin et al., "Banding artifact reduction in electrophotographic printers by using pulse width modulation", IS&T's NIP16: 2000 International Conference on Digital Printing Technologies; for the Contrast Sensitivity Function (CST): Peter G. Barten, "Evaluation of subjective image quality with the square-root integral method"; and for Power-Spectrum Analysis: E. Oran Brigham, "The Fast Fourier Transform", Prentice Hall, 1988, p365ff.

With respect to the coalescence analysis and with reference to the above literature citation on coalescence analysis, this analysis process will be discussed by way of example.

In the coalescence analysis, test charts with uniform, unstructured test patterns are used. Typically, such a test chart includes a field of, for example, 9×11 test patterns. The individual test patterns thereby have different densities and different colors.

A test chart thereby includes an electronic image original (for example an image file in the TIF, BMP, or PSD format) with suitably and/or unstructured patterns, codes and markings. A test pattern represents a geometrically limited portion of a test chart, which can be used for analysis of the image quality. Different types of test patterns are applicable and can be used. A test pattern can be structured (for example a line pattern) or also unstructured (for example uniform color areas). The type of test pattern is generally dependent on the analysis to be carried out, whereby different types of test patterns are used, for example, for banding analysis and coalescence analysis.

The test patterns are used to initiate the test printout for the generation of a test image. The printout of the digital form of the reference test chart is initiated on a suitable device, for example an inkjet printer, a laser printer, a photo exposer, or the like. The printout can be carried out on any desired medium of interest, for example paper, foil, photographic paper or textiles. This test chart printout is subsequently scanned and digitized.

The test chart image thereby represents an electronic image of the test chart print captured (for example scanned and digitized) with a scanner or a digital camera. The test image therefore consists of digital data and can, for example, be present in the form of a file (for example an image file in the TIF, BMP or PSD format) or in a memory in the computer (for example in the intermediate memory of the user level).

The prepared image data are transferred by a two-dimensional Fourier transform into the frequency space. In order to obtain a direction independent, one-dimensional frequency spectrum (power density spectrum) the two-dimensional frequency space is first transformed from cartesic into polar coordinates. An estimation of the one-dimensional power density spectrum is then calculated therefrom. However, not all frequency components of this spectrum are perceived equally strongly (or at all) by the human. This circumstance is taken into account in that the power density spectrum is weighted with a so-called contrast sensitivity function (CSF). Certain assumptions regarding the observation distance and illumination strength are thereby made. Only a very specific frequency range of this weighted spectrum is relevant for this coalescence analysis. This portion is extracted from the spectrum with a bandpass filter and the total power in this frequency band is subsequently determined. The total power is then used as a measure for the coalescence. This technical measure is then transformed with a suitable table or a suitable function into an image quality measure which does the human perception justice. This table or function was previously determined by experiments with test persons.

A reference test chart is a test chart which includes a certain number of test patterns. The number and type of the test patterns is dependent on the analysis to be carried out therewith. For example, a test chart can include an unstructured test pattern for a banding analysis and a test chart can include a field of 9×11 unstructured test patterns for a coalescence analysis. The positioning of the test patterns, the exact location of the individual test patterns and the type of the individual test patterns can be stored in a separate electronic table or databank. A machine-readable code is applied to the test chart, which assigns the test chart to a corresponding table entry or data set in the data bank. Furthermore, a series of markings can be provided on the test chart. The markings serve to make the card machine readable, which means especially fully automatically analyzable. Suitable markings can among other things be used to determine the following parameters and information on the test chart with respect to the test print, which means the apparatus specific printout of the test chart:

the location of the printed test patterns on the test print;
the exact size of the test print;
the exact orientation of the test print (angle);
the geometric distortion of the test print;
the chart type (for example chart for coalescence analysis, for graininess, etc.); and
further information (for example printing orientation used).

Such a test chart according to the invention can also be made the subject of a claim.

BRIEF DESCRIPTION OF THE DRAWINGS

The patent or application file contains at least one drawing executed in color. Copies of this patent or patent application publication with color drawing(s) will be provided by the Patent and Trademark Office request and payment of the necessary fee.

The invention will now be described in further detail by way of example only and with reference to the drawings, wherein.

DETAILED DESCRIPTION OF THE PREFERRED EMBODIMENTS

Figure 1A:
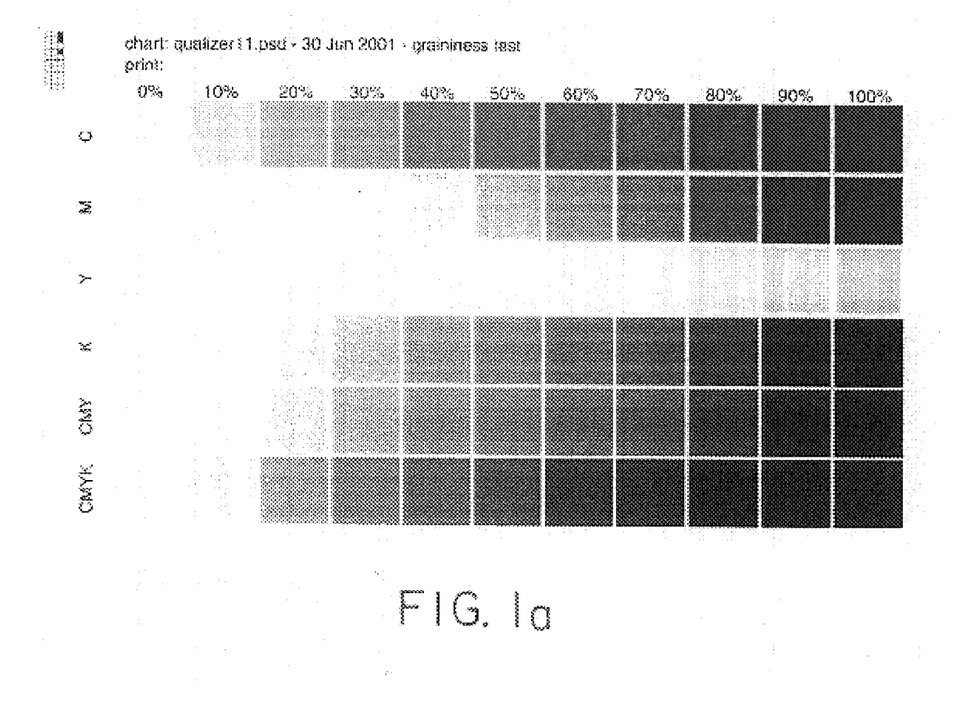
FIGS. 1a to 1c, show test patterns for graininess, coalescence and banding on test chart printouts of printers with good print quality.
Figure 1B:
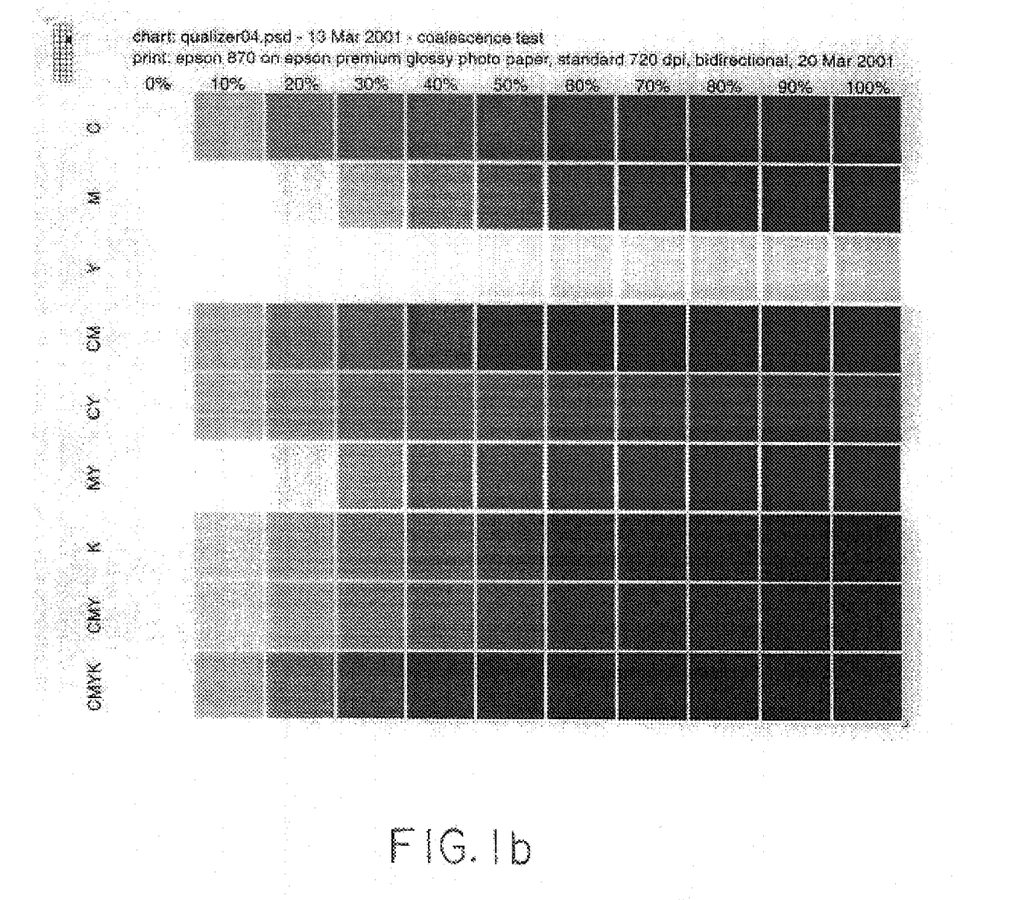
Figure 1C:
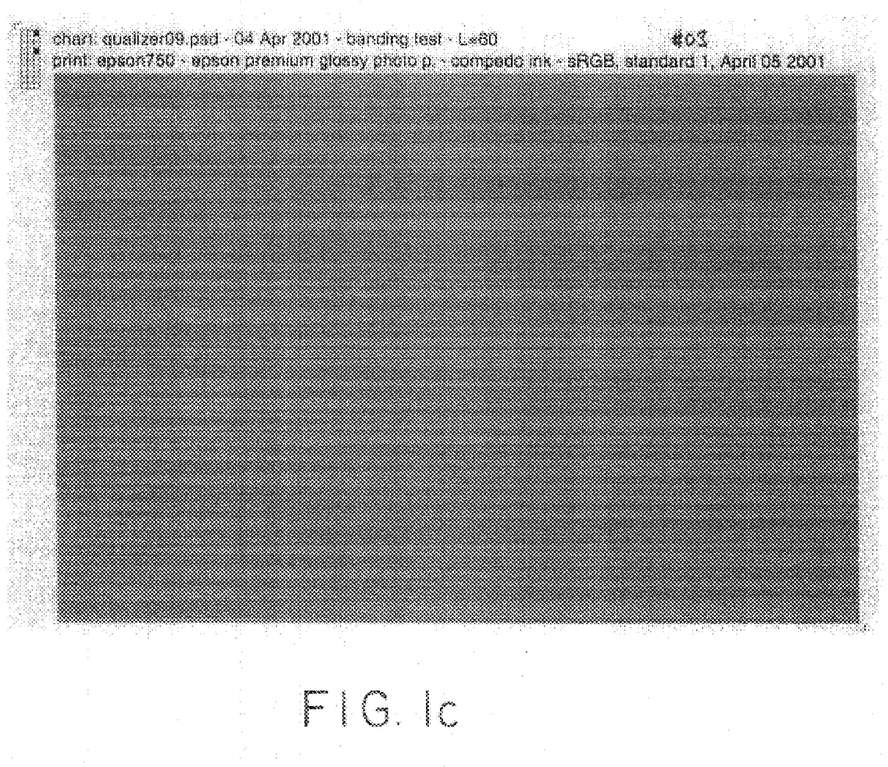

The test patterns illustrated in FIGS. 1a to 1c, deviate only little from the optimum, which means they are distinguished only little from the respective reference test pattern. On the other hand, the test patterns illustrated in FIGS. 2a to 2c, deviate strongly from the optimum. The illustrated patterns are captured and compared by a processor with the corresponding patterns of the digital reference test chart, in order to determine the picture quality of the photo printer specific printouts in comparison to the digital original, which means the test pattern of the reference test chart, and whether this quality lies within the preselected quality tolerance range.

Figure 2A:
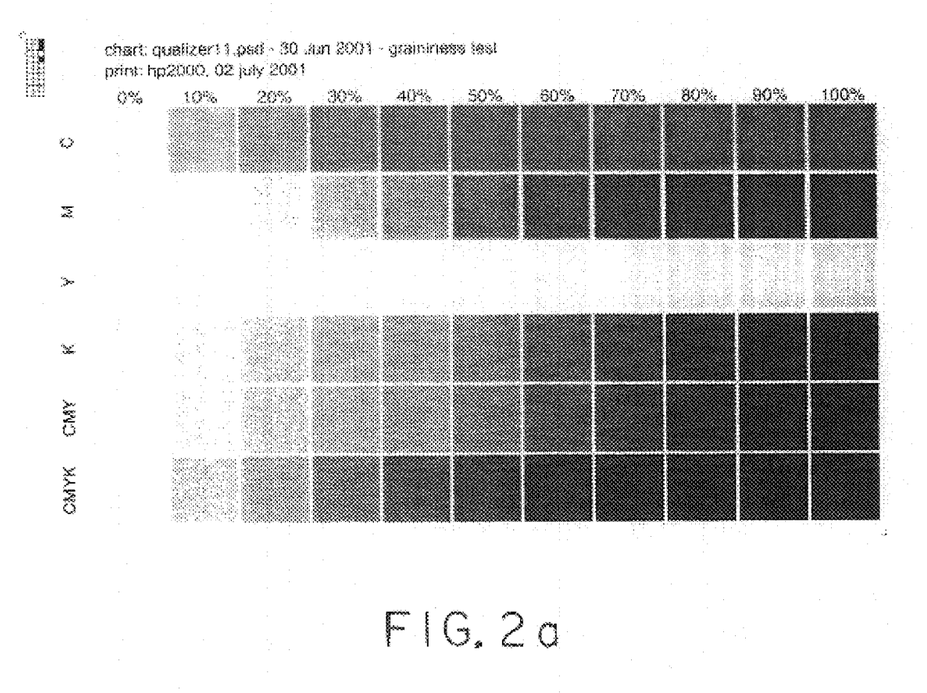
FIGS. 2a to 2c, show test patterns for graininess, coalescence and banding on test chart printouts of printers with bad print quality.

Accordingly, FIG. 2a shows a photo printer specific test pattern with a graininess that is highly disturbing to an observer, while FIG. 1a on the right shows a photo printer specific test pattern with no apparent disturbing graininess.

A comparison of the photo printer specific test patterns with the associated reference test patterns makes the graininess of the test pattern of FIG. 2a apparent. Such a deviation could also fall outside a tolerance interval graininess after application and would require a calibration, a change of the print strategy, maintenance, testing and/or an exchange of the material used or the use of a software based correction program in order to correct the quality of the printout of a corresponding inkjet printer or a photo printer.

Figure 2B:
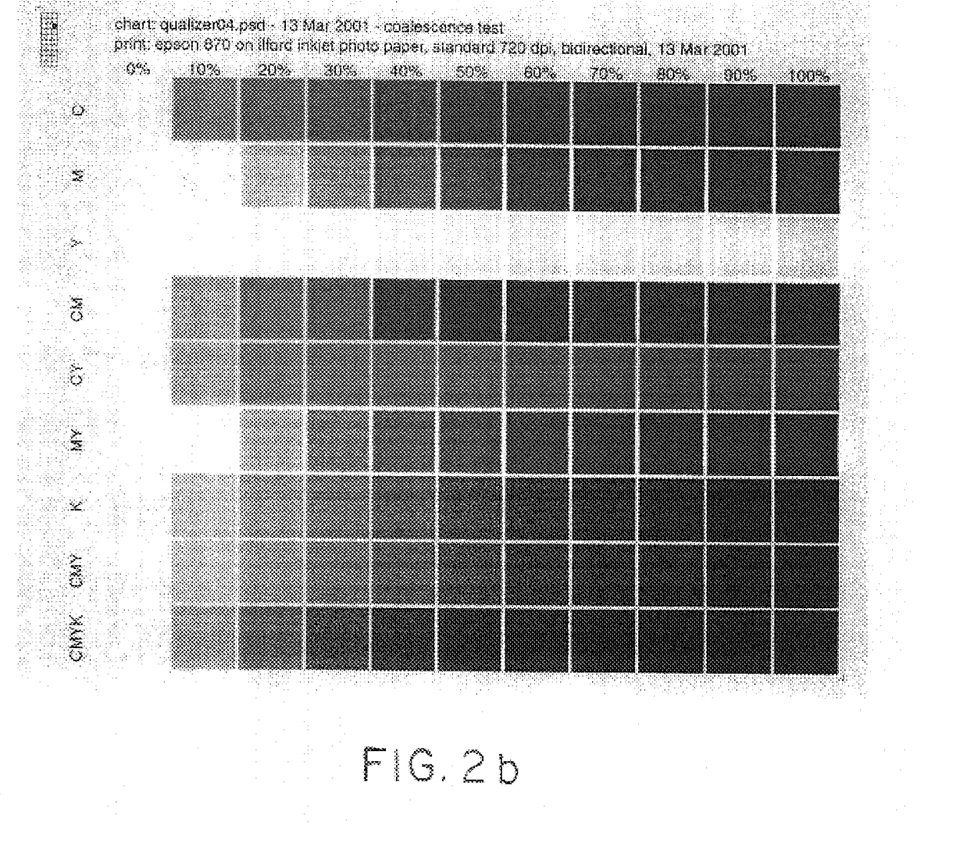

FIG. 2b shows a photo printer specific test pattern which in contrast to the pattern according to FIG. 1b suffers from strong coalescence disturbances. The photo printer specific test pattern, when compared with the reference test pattern would here again initiate maintenance or another correction for the improvement of the image quality.

Figure 2C:
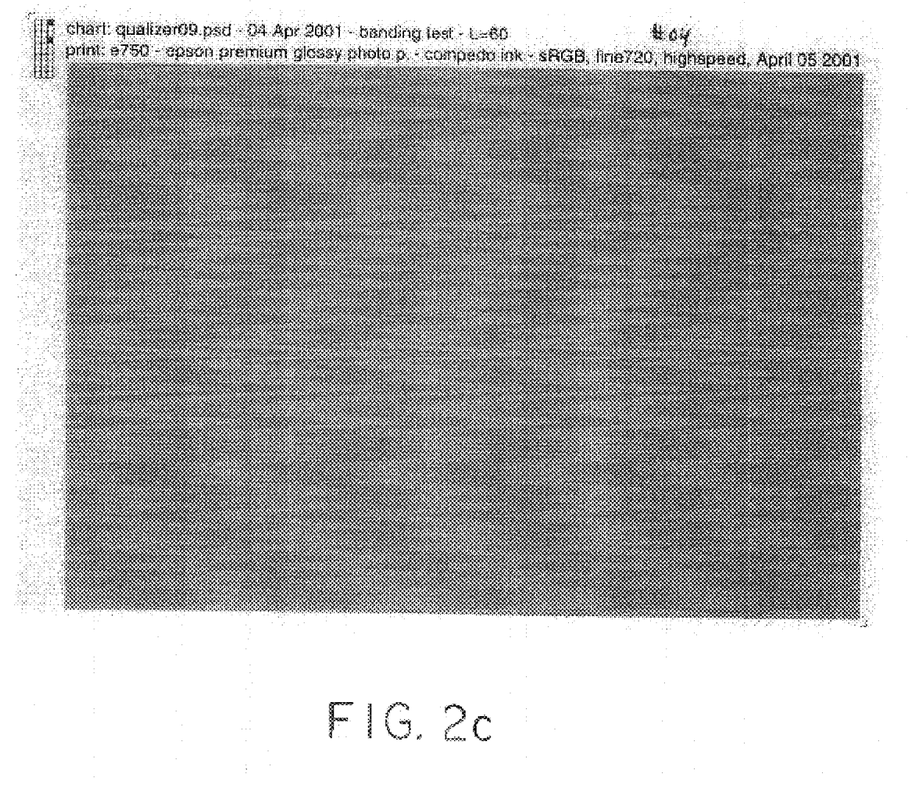

The right image according to FIG. 1c shows practically no banding while the image according to FIG. 2c shows an disturbing horizontal banding, which compared to the reference test pattern can equally lead to a quality improving reaction.

Figure 3:
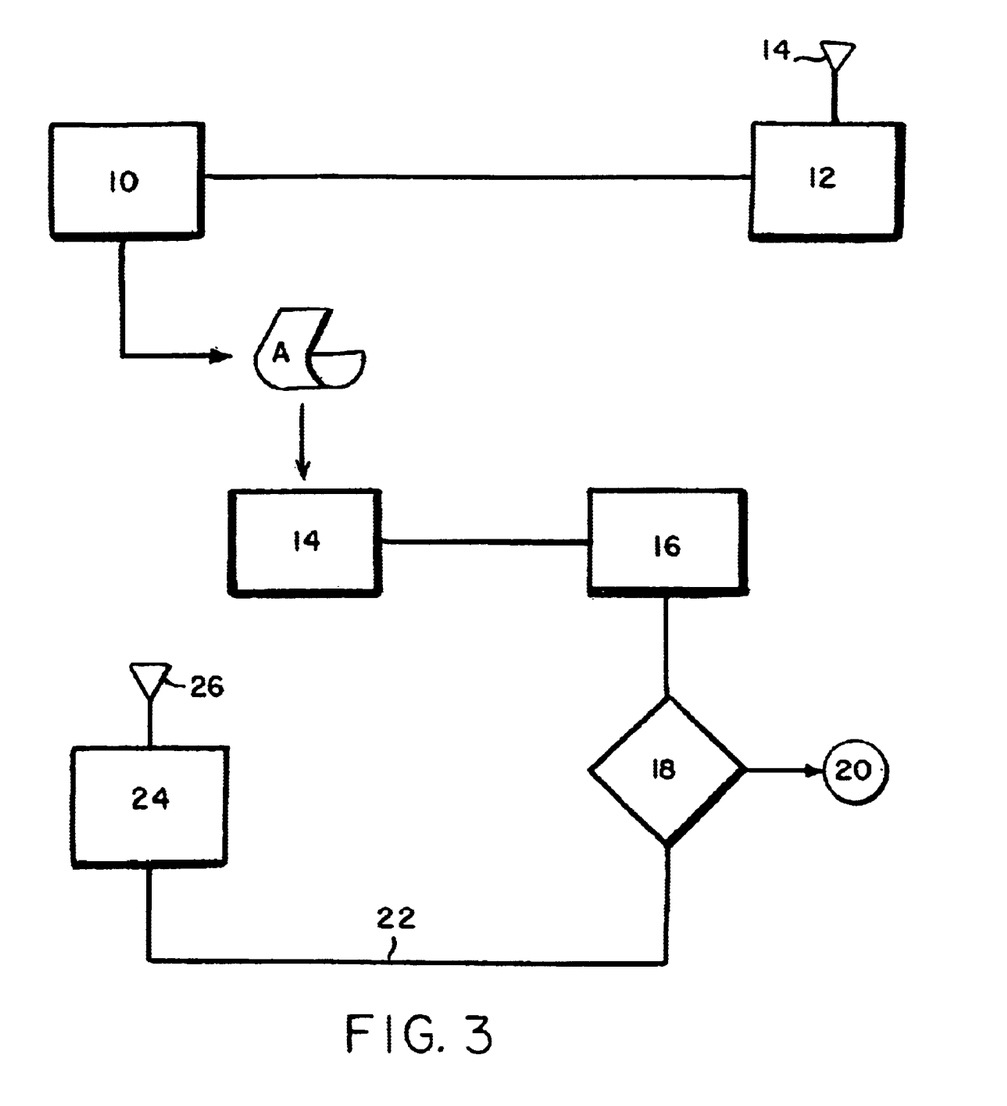
FIG. 3 is a block diagram of a process flow with features according to the invention.

FIG. 3 illustrates an example of the flow of a process according to the invention.

A photo printer 10, for example a color inkjet photo printer, a laser printer, or the like is connected to a memory 12, which of course can also be included in the printer 10. A reference test chart is stored in the memory 12 which can include different print commands which are used by the respective printer 10 for the production of a photo printer specific test chart print A.

The printer 10 and/or the memory 12 can be connected to a data line 11, for example the internet, a telephone line, or the like, to receive modified reference test chart data, print parameters or correction software. Of course, the memory 12 can also include correction software which can be activated through the data line 11 or can be provided with modified parameters and activated.

It is possible, to position or move the print heads of inkjet printers (relative to one another) preferably during the printing in order to remove the banding. The graininess of a printout can also be mitigated or suppressed, when the driver software for a corresponding printhead is varied or operated with other parameters. In particular, it is also possible to carry out a remote diagnosis and to initiate a remote maintenance through a data line 14.

The photo printer 10 prints a photo printer specific test chart print which directly at the location of the photo printer 10 can be brought to a scanner in the form of a flatbed scanner or a digital camera in order to be scanned and digitized. It is also conceivable that the scanner or the digital camera are already incorporated into the printer.

The digitized image data are transmitted to a processor 16 which carries out known or new image analysis of the image data on the basis of individual or several quality features. The processor 16 can also carry out a calibration in that specific peculiarities of the scanner 14 are removed by calculation from the image data in order to carry out an image data standardization. The calibrated or standardized image data can then be compared with the generally applicable reference test patterns of the reference test charts.

It can then be decided in a decision device 18, which can be part of the processor 16, whether maintenance, use of a correction software, or the like is required. Accordingly, in the case where no maintenance is necessary, an alternative 20 can be chosen, whereby the photo printer 10 is further operated without change.

On the other hand, as already discussed, maintenance or the use of a quality improvement software can be initiated through the alternative 22. A variable control of the printheads of the photo printer 10 can then be carried out, for example, through a data line 26. A color correction can be initiated and the like.

What is claimed is:

1. Process for automatically determining the image quality of a picture produced by a printing device or photo exposer, comprising the steps of:
   a) providing a reference test chart and transforming it into a digital form;
   b) inputting the digital form of the reference test chart into a photo printer;
   c) producing in the photo printer a photo printer specific test chart printout of the digital reference test chart;
   d) scanning the photo printer specific test chart printout and comparing the obtained digital image of the test chart printout with the digital form of the reference test chart; and
   e) determining at least one quality parameter by way of concurrences and/or deviations obtained by the comparison between the reference test pattern and the photo printer specific test image;
   wherein the reference test chart is one of a single reference test chart and a set of reference test charts and includes several test patterns which respectively specifically react to different causes for image quality, the test patterns being compared with a photo printer specific test image or with photo printer specific test image test patterns.

2. The process according to claim 1, for use in determining the image quality of pictures produced by a color inkjet photo printer or an inkjet photo printer.

3. Process according to claim 1, wherein real quality values are determined from the test patterns of a photo printer specific test chart printout, and the real quality values are compared with the optimal quality values of the test pattern of the referenced test chart.

4. Process according to claim 1, wherein when the comparison falls outside a tolerance interval with preselected threshold values, the image quality is considered not sufficient.

5. Process according to claim 1, further comprising the step of determining on the basis of the quality parameter measured whether a printing or printer device must be maintained, repaired, or replaced.

6. Process according to claim 1, further comprising the step of carrying out a quality improvement with a quality correction device or software included in the printing or print device or photo exposure device and addressed to carry out the quality improvement.

7. Process according to claim 1, wherein the at least one quality parameter is calibrated whereby apparatus specific properties are taken into consideration by the image capture apparatus involved in the process.

8. Process according to claim 1, comprising the further step of determining the location of the test patterns on a photo printer specific test chart printout for automatically comparing them with the corresponding test patterns of the reference test chart.

9. Process according to claim 1, wherein several analysis test patterns respectively developed for at least one test are output with a photo printer specific test chart printout or a set of such test charts.

10. Process according to claim 1, wherein at least the reference test pattern includes several test patterns for specific analysis of at least one of the following features:
   i) banding;
   ii) coalescence;
   iii) color bleed;
   iv) dot gain;
   v) image misregistration;
   vi) color misregistration;
   vii) graininess;
   viii) uniformity;
   ix) image sharpness;
   x) color balance; and
   xi) color accuracy.

* * * * *